(12) United States Patent
Diegmann

(10) Patent No.: US 10,608,916 B2
(45) Date of Patent: Mar. 31, 2020

(54) MEASURING DEVICE AND METHOD FOR DYNAMICALLY SELECTING A CHANNEL BANDWIDTH

(71) Applicant: Rohde & Schwarz GmbH & Co. KG, Munich (DE)

(72) Inventor: Philip Diegmann, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/467,757

(22) Filed: Mar. 23, 2017

(65) Prior Publication Data
US 2018/0278508 A1   Sep. 27, 2018

(51) Int. Cl.
*H04J 3/00* (2006.01)
*H04L 12/26* (2006.01)
*H04L 12/803* (2013.01)

(52) U.S. Cl.
CPC ........ *H04L 43/0894* (2013.01); *H04L 47/125* (2013.01)

(58) Field of Classification Search
None
See application file for complete search history.

(56) References Cited

U.S. PATENT DOCUMENTS

| | | | | |
|---|---|---|---|---|
| 4,839,582 A * | 6/1989 | Fukaya | ................ | G01R 23/173 324/76.19 |
| 5,731,699 A * | 3/1998 | O'Byrne | ................ | H04B 17/26 324/76.19 |
| 5,852,638 A * | 12/1998 | Chen | ..................... | H04L 27/144 375/344 |
| 5,869,959 A * | 2/1999 | Tomikawa | ............. | G01R 23/16 324/76.19 |
| 6,356,067 B1 * | 3/2002 | Nara | ..................... | G01R 23/16 324/76.19 |
| 6,507,624 B1 * | 1/2003 | Jachim | ................ | G01R 23/165 324/76.23 |
| 7,352,827 B2 * | 4/2008 | Earls | .................. | G01R 13/0254 375/229 |
| 7,428,464 B2 * | 9/2008 | Nara | ................... | G01R 35/005 702/72 |
| 8,374,812 B2 * | 2/2013 | Nara | .................. | G01R 13/0236 324/76.19 |
| 8,514,919 B2 * | 8/2013 | Estrada | .................. | G01R 23/16 324/318 |
| 8,675,719 B2 * | 3/2014 | Dobyns | .............. | G01R 13/0236 375/224 |
| 2005/0102115 A1 * | 5/2005 | Waldo | .................. | G01R 13/029 702/68 |

(Continued)

*Primary Examiner* — Kwang B Yao
*Assistant Examiner* — Juvena W Loo
(74) *Attorney, Agent, or Firm* — Potomac Technology Law, LLC

(57) ABSTRACT

A measuring device measures an input signal. The measuring device comprises at least two domains of measurement each for analyzing the signal in its corresponding manner, a selector for selecting a first domain of measurement or a second domain of measurement out of the at least two domains of measurement. A controller is in communication with the selector. The controller is configured to set a first bandwidth for the first domain of measurement and a second bandwidth for the second domain of measurement.

19 Claims, 3 Drawing Sheets

(56) References Cited

U.S. PATENT DOCUMENTS

| | | | |
|---|---|---|---|
| 2005/0175079 A1* | 8/2005 | Gamper | G01R 13/0209 375/228 |
| 2005/0201488 A1* | 9/2005 | Duff | H04L 1/246 375/316 |
| 2012/0310601 A1* | 12/2012 | Martin | G01R 13/0272 702/190 |
| 2013/0060527 A1* | 3/2013 | Martin | G01R 13/0254 702/189 |
| 2015/0146826 A1* | 5/2015 | Katabi | H04L 27/265 375/340 |
| 2015/0301086 A1* | 10/2015 | Schaefer | G01R 13/0263 324/76.13 |
| 2018/0225230 A1* | 8/2018 | Litichever | G06F 21/56 |

* cited by examiner

MEASURING DEVICE AND METHOD FOR DYNAMICALLY SELECTING A CHANNEL BANDWIDTH

TECHNICAL FIELD

The invention relates to a measuring device and a measuring method for dynamically selecting a channel bandwidth.

BACKGROUND

Generally, in times of an increasing number of electrical circuits applied in many different applications, there is a growing need of a measuring system and a method for measuring signals with respect to these circuits in a most efficient manner in order to allow for a highly performant and low-cost test equipment for testing the correct functionality of said circuits.

U.S. Pat. No. 4,839,582 relates to a signal analyzer apparatus for analyzing signal characteristics in a frequency region, upon sweeping of the signal in a wide frequency band, so that a frequency at a desired point of the characteristics can be measured with high precision. Disadvantageously, in accordance with said document, with respect to the most interesting portion of the bandwidth, the bandwidth is exclusively narrowed, which considerably limits the possibility of measuring and testing.

Accordingly, there is a need for an approach for a measuring device and a measuring method for dynamically selecting a channel bandwidth.

SOME EXAMPLE EMBODIMENTS

Embodiments of the present invention advantageously address the foregoing requirements and needs, as well as others, by providing a measuring device and a measuring method for dynamically selecting a channel bandwidth.

According to a first aspect of the invention, a measuring device for measuring a signal is provided. The measuring device comprises at least two domains of measurement each for analyzing the signal in its corresponding manner, a selector for selecting a first domain of measurement or a second domain of measurement out of the at least two domains of measurement, and a controller being in communication with the selector. The controller is configured to set a first bandwidth for the first domain of measurement and a second bandwidth for the second domain of measurement. Advantageously, this allows the manufacturer of the measuring device to limit the bandwidth on each domain of measurement without allowing the user to have access to the entire bandwidth for each domain. In this manner, it is allowed for the customer to buy a cheaper oscilloscope with a lower bandwidth in one domain, which does not need a wide bandwidth.

According to a first implementation form of the first aspect, the first bandwidth is different from the second bandwidth. As already mentioned above, this allows the customer to buy a cheaper oscilloscope with a lower bandwidth in one domain, which does not need a wide bandwidth.

According to a further implementation form of the first aspect, each of the first domain of measurement and the second domain of measurement is selected from time, frequency or protocol decode. Advantageously, this allows electromagnetic compatibility (EMC) testing in the frequency domain at a higher bandwidth and a higher bandwidth on the protocol decode.

According to a further implementation form of the first aspect, each of the first bandwidth and the second bandwidth is available for analyzing the same signal on a single channel. Advantageously, in this manner, the protocol decode can still be seen when looking at the radio frequency (RF) signal.

According to a further implementation form of the first aspect, the single channel comprises a splitter configured to split the signal.

According to a further implementation form of the first aspect, the splitter is further configured to provide an identical split of the signal to each of a plurality of filters. Advantageously, this allows analysis in two different bandwidths for the respective domains of measurement on the single channel, which is especially useful in protocol decode.

According to a further implementation form of the first aspect, at least one of the plurality of filters is a low pass filter.

According to a further implementation form of the first aspect, at least one of the at least two domains of measurement comprises a fast fourier transform analysis.

According to a further implementation form of the first aspect, the first bandwidth applies for an analysis in the time domain.

According to a further implementation form of the first aspect, the second bandwidth applies for an analysis in the frequency domain.

According to a second aspect of the invention, a measuring method for measuring a signal is provided. The measuring method comprises the steps of analyzing the signal according to each of at least two domains of measurement in the corresponding manner, selecting a first domain of measurement or a second domain of measurement out of the at least two domains of measurement with the aid of a selector, and setting a first bandwidth for the first domain of measurement and a second bandwidth for the second domain of measurement with the aid of a controller being in communication with the selector. Advantageously, this allows the manufacturer of the measuring device to limit the bandwidth on each domain of measurement without allowing the user to have access to the entire bandwidth for each domain. In this manner, it is allowed for the customer to buy a cheaper oscilloscope with a lower bandwidth in one domain, which does not need a wide bandwidth.

According to a first implementation form of the second aspect, the first bandwidth is different from the second bandwidth. As already mentioned above, this allows the customer to buy a cheaper oscilloscope with a lower bandwidth in one domain, which does not need a wide bandwidth.

According to a further implementation form of the second aspect, the measuring method further comprises the step of selecting each of the first domain of measurement and the second domain of measurement from time, frequency or protocol decode. Advantageously, this allows EMC testing in the frequency domain at a higher bandwidth and a higher bandwidth on the protocol decode.

According to a further implementation form of the second aspect, each of the first bandwidth and the second bandwidth is available for analyzing the same signal on a single channel. Advantageously, in this manner, the protocol decode can still be seen when looking at the RF signal.

According to a further implementation form of the second aspect, the measuring method further comprises the step of splitting the signal on the single channel with the aid of a splitter comprised by the single channel.

According to a further implementation form of the second aspect, the measuring method further comprises the step of providing an identical split of the signal to each of a plurality of filters with the aid of the splitter, wherein at least one of the plurality of filters is a low pass filter. Advantageously, this allows analysis in two different bandwidths for the respective domains of measurement on the single channel, which is especially useful in protocol decode.

According to a further implementation form of the second aspect, at least one of the at least two domains of measurement comprises a fast fourier transform analysis.

According to a further implementation form of the second aspect, the first bandwidth applies for an analysis in the time domain or the second bandwidth applies for an analysis in the frequency domain.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

A measuring device and a measuring method for dynamically selecting a channel bandwidth are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Figure 1:
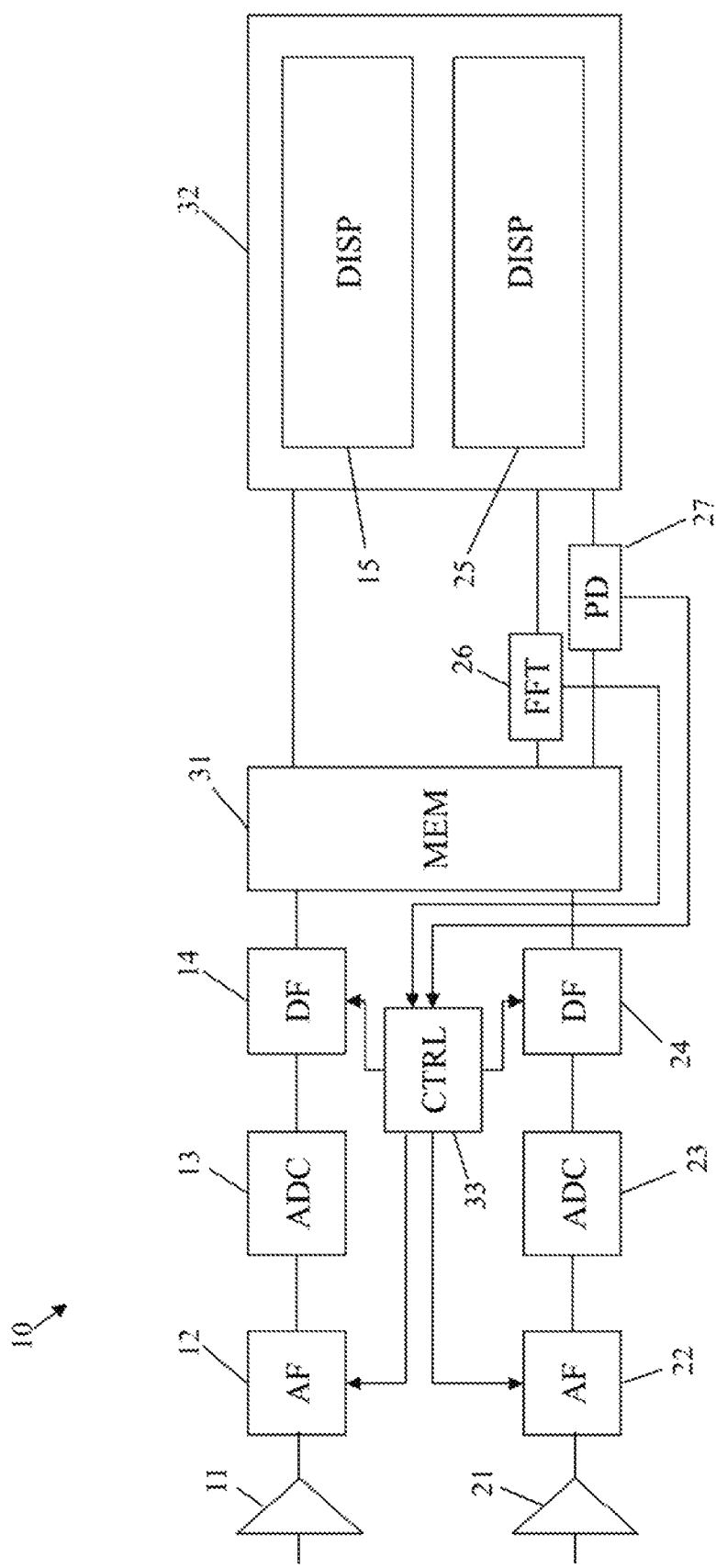
FIG. 1 shows a block diagram of a measuring device according to example embodiments of the present invention.

FIG. 1 shows a block diagram of a measuring device 10 according to example embodiments of the present invention. According to FIG. 1, the measuring device 10 provides a first channel and a second channel, each of which is connected to a memory 31.

The first channel comprises a first amplifier 11, a first analog filter 12, especially an analog low-pass filter, a first analog-to-digital converter 13, and a first digital filter 14, especially a digital low-pass filter. The output of the first amplifier 11 is connected to the input of the first analog filter 12, the output of which is connected to the input of the first analog-to-digital converter 13. Whereas the output of the first analog-to-digital converter 13 is connected to the input of the first digital filter 14, the output of the first digital filter 14 is connected to the memory 31.

Furthermore, the second channel comprises a second amplifier 21, a second analog filter 22, especially an analog low-pass filter, a second analog-to-digital converter 23, and a second digital filter 24, especially a digital low-pass filter. The output of the second amplifier 21 is connected to the input of the second analog filter 22, the output of which is connected to the input of the second analog-to-digital converter 23. Whereas the output of the second analog-to-digital converter 23 is connected to the input of the second digital filter 24, the output of the second digital filter 24 is connected to the memory 31.

In addition to this, each of the first analog filter 12, the first digital filter 14, the second analog filter 22, and the second digital filter 24 is connected to a controller 33, especially to outputs of the controller 33.

Moreover, the memory 31 is connected to a display unit 32. Especially the memory 31 comprises a direct connection to the display unit 32. Additionally, the memory 31 is connected to a fast fourier transform (FFT) unit 26 especially for performing a FFT analysis, the output of which is connected to the display unit 32. Furthermore, the memory 31 is also connected to a protocol decode unit 27 especially for decoding protocols, the output of which is connected to the display unit 32. Therefore, the memory 31 comprises two indirect connections to the display unit 32.

In addition to this, each of the FFT unit 26, and the protocol decode unit 27, is connected to the controller 33, especially to inputs of the controller 33. In this manner, the desired bandwidth with respect to the signal to be measured by the measuring device 10 can be selected.

Advantageously, as a consequence of this, the general problem that the entire bandwidth of a measuring device is locked and the range has a global effect on all measuring applications, which leads to the fact that if, for example, the maximum bandwidth in the time domain is 100 MHz, the bandwidth with respect to performing a FFT analysis is also limited to the preset global bandwidth of 100 MHz, has been solved.

Accordingly, if the measuring person would like to have a higher bandwidth especially for performing FFT analysis or protocol decode, for each of which the usage of a higher bandwidth is particularly advantageous with special respect to accuracy, the respective bandwidth can be enlarged with the aid of the controller 33 for this purpose in a most efficient manner.

Furthermore, the display unit 32 comprises a first display area 15 and a second display area 25. This is particularly advantageous because whereas the first display area 15 displays a presentation of the signal to be measured by the measuring device 10 in the time domain, the second display area 25 displays a frequency spectrum of the signal or a presentation of the decoded protocol.

Figure 2:
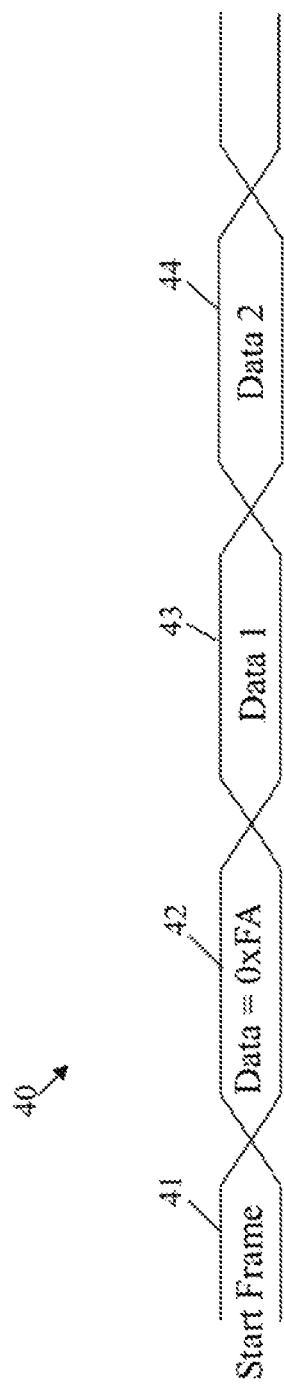
FIG. 2 shows an example of a data structure that can be used with respect to example embodiments of the present invention.

FIG. 2 shows an example of a data structure 40 that can be used with respect to example embodiments of the present invention.

As it can be seen, the data structure 40 begins with a start frame 41. Afterwards, a data section 42, which is equal to 0xFA in hexadecimal format, is sent. In this context, it should be mentioned that with special respect to the I²C (inter-integrated circuit) bus, the first data section 42 being equal to the hexadecimal value 0xFA is a reserved command, especially a read command.

After the read command being sent, two further data sections 43 and 44 are sent, each of which typically comprises payload.

Figure 3:
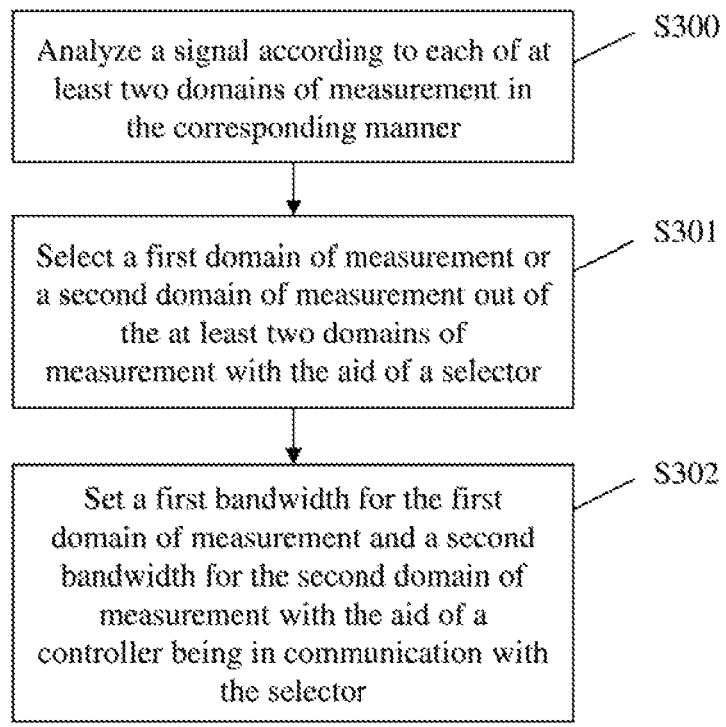
FIG. 3 shows a flow chart depicting a measuring method according to example embodiments of the present invention.

FIG. 3 shows a flow chart depicting a measuring method according to example embodiments of the present invention. In a first step S300, a signal is analyzed according to each of at least two domains of measurement in the corresponding manner. Then, in a second step S301, a first domain of measurement or a second domain of measurement is selected out of the at least two domains of measurement with the aid of a selector. In addition to this, in a third step S302, a first bandwidth is set for the first domain of measurement and a second bandwidth is set for the second domain of measurement with the aid of a controller being in communication with the selector.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A measuring device for measuring a signal, the measuring device comprising:
   at least two domains of measurement each for analyzing the signal in a corresponding manner;
   a selector for selecting a first domain of measurement or a second domain of measurement out of the at least two domains of measurement;
   a controller being in communication with the selector;
   a protocol decoder configured to decode protocols; and
   a display connected to an output of the protocol decoder, which is configured to display a time domain presentation of the signal in a first display area and a frequency spectrum of the signal or a presentation of a decoded protocol generated by the protocol decoder in a second display area; and
   wherein the controller is connected to the protocol decoder,
   wherein the controller is configured to set a first bandwidth for the first domain of measurement and a second bandwidth for the second domain of measurement, and
   wherein the first bandwidth and the second bandwidth is each limited without allowing a user to access an entire bandwidth for each domain.

2. The measuring device according to claim 1, wherein the first bandwidth is different from the second bandwidth.

3. The measuring device according to claim 1, wherein each of the first domain of measurement and the second domain of measurement is selected from time, frequency or protocol decode.

4. The measuring device according to claim 1, wherein each of the first bandwidth and the second bandwidth is available for analyzing the same signal on a single channel.

5. The measuring device according to claim 4, wherein the single channel comprises a splitter configured to split the signal.

6. The measuring device according to claim 5, wherein the splitter is further configured to provide an identical split of the signal to each of a plurality of filters.

7. The measuring device according to claim 6, wherein at least one of the plurality of filters is a low pass filter.

8. The measuring device according to claim 1, wherein at least one of the at least two domains of measurement comprises a fast fourier transform analysis.

9. The measuring device according to claim 1, wherein the first bandwidth applies for an analysis in a time domain.

10. The measuring device according to claim 1, wherein the second bandwidth applies for an analysis in a frequency domain.

11. A measuring method for measuring a signal, the measuring method comprising the steps of:
    analyzing the signal according to each of at least two domains of measurement in a corresponding manner;
    selecting a first domain of measurement or a second domain of measurement out of the at least two domains of measurement with the aid of a selector;
    setting a first bandwidth for the first domain of measurement and a second bandwidth for the second domain of measurement with the aid of a controller being in communication with the selector;
    decoding protocols with the aid of a protocol decoder which is connected to the controller; and
    displaying, via a display connected to an output of the protocol decoder, a time domain presentation of the signal in a first display area or the display, and a frequency spectrum of the signal or a presentation of a decoded protocol generated by the protocol decoder in a second display area of the display;
    wherein the first bandwidth and the second bandwidth is each limited without allowing a user to access an entire bandwidth for each domain.

12. The measuring method according to claim 11, wherein the first bandwidth is different from the second bandwidth.

13. The measuring method according to claim 11, further comprising the step of:
    selecting each of the first domain of measurement and the second domain of measurement from time, frequency or protocol decode.

14. The measuring method according to claim 11, wherein each of the first bandwidth and the second bandwidth is available for analyzing the same signal on a single channel.

15. The measuring method according to claim 14, further comprising the step of:
    splitting the signal on the single channel with the aid of a splitter comprised by the single channel.

16. The measuring method according to claim 15, further comprising the step of:
    providing an identical split of the signal to each of a plurality of filters with the aid of the splitter, wherein at least one of the plurality of filters is a low pass filter.

17. The measuring method according to claim 11, wherein at least one of the at least two domains of measurement comprises a fast fourier transform analysis.

18. The measuring method according to claim 11, wherein the first bandwidth applies for an analysis in a time domain.

19. The measuring method according to claim 11, wherein the second bandwidth applies for an analysis in a frequency domain.

\* \* \* \* \*